United States Patent
Perchak

(10) Patent No.: US 7,920,337 B2
(45) Date of Patent: Apr. 5, 2011

(54) WIDE ANGLE SURFACE GENERATOR AND TARGET

(75) Inventor: Robert M. Perchak, Dayton, OH (US)

(73) Assignee: Mirage Holography Ltd., Dayton, OH (US)

( * ) Notice: Subject to any disclaimer, the term of this patent is extended or adjusted under 35 U.S.C. 154(b) by 35 days.

(21) Appl. No.: 12/072,589

(22) Filed: Feb. 27, 2008

(65) Prior Publication Data
US 2008/0165433 A1    Jul. 10, 2008

Related U.S. Application Data

(63) Continuation of application No. 10/242,829, filed on Sep. 13, 2002, now abandoned.

(51) Int. Cl.
*G02B 3/02*      (2006.01)

(52) U.S. Cl. .................................................. 359/709

(58) Field of Classification Search .................. 359/709, 359/720, 837
See application file for complete search history.

(56) References Cited

U.S. PATENT DOCUMENTS

| | | | | |
|---|---|---|---|---|
| 4,531,216 A | * | 7/1985 | Tyler | 372/9 |
| 4,898,470 A | * | 2/1990 | Cleaveland | 356/513 |
| 5,475,197 A | * | 12/1995 | Wrobel et al. | 219/121.69 |
| 2001/0019404 A1 | * | 9/2001 | Schuster et al. | 355/67 |

* cited by examiner

*Primary Examiner* — Ricky L Mack
*Assistant Examiner* — James R Greece
(74) *Attorney, Agent, or Firm* — Joseph G. Nauman

(57) ABSTRACT

An axicon is disclosed comprising a generally cylindrical body having an exterior surface 31, preferably a cylindrical surface. A first outwardly reflective lens surface 32 and a second inwardly reflective lens surface 35 are formed at opposite ends of the body. A light input beam from a suitable source is directed into one of those surfaces and through the axicon to the other of those surfaces, and the beam is transformed by the axicon into a beam(s) exiting such other surface. The shape and angular extent of the exit beam will depend, in part, on the selected position of the first surface with respect to the optical axis of the axicon and/or the second surface. The axicon is an optical grade unit, preferably unitary, which can receive light of a specified pattern through a first surface, redirect and modify the light, and output light of a different pattern though a second surface. In one configuration a concentrated light beam can be input to the axicon and output as a differently shaped beam, such as defining a predetermined plane or geometric surface. In another configuration, light surrounding the axicon can be input to the first surface 32, concentrated and then output through the second surface 35 as a beam of predetermined size and shape, such as may be be sensed by a photodiode supported at or near the focal point of the lens.

7 Claims, 3 Drawing Sheets

WIDE ANGLE SURFACE GENERATOR AND TARGET

PRIORITY CLAIM

This application is a continuation of U.S. patent application Ser. No. 10/242,829 filed Sep. 13, 2002 now abandoned.

FIELD OF THE INVENTION

This invention relates to simplified optical devices for the generation of optically visible reference patterns and also as target devices which are useful for alignment and guidance purposes, especially in cooperation with photosensitive units (e.g photocells, photodiodes, etc.) and related electronics.

SUMMARY OF THE INVENTION

Several embodiments of the invention are disclosed, which are unique optical members, hereinafter called axicons, which accept an input beam, such as from a laser light source, and transform and output that beam as a fan shaped beam of coherent light directed along a desired plane or other surface shape. These optical members (axicons) can also be adapted to use as targets receiving omni-directional light input over relatively wide angles, e.g. 180° to 360°, preferably in combination with photodiodes or the like which are sensitive to intensity of light rays directed (output) onto them by the targets.

The optical members are elongated optical grade units comprising a specially formed axicon which can receive light of a specified pattern through a first surface, redirect and modify the light, and output light of a different pattern though a second surface. For example in a first case, a concentrated light beam can be input to the axicon and output as a differently shaped beam, such as along a predetermined plane or, in another case, light surrounding the axicon can be input, concentrated and output as a beam of predetermined size and shape onto a photodiode supported at or near the focal point of the lens. The optical members are preferably unitary, and have the axicon and lens configurations formed onto or in them, but they may be provided and utilized as a matched pair. The shaped beam (for example fan shaped) can be used for a number of different alignment purposes.

The photodiodes (or equivalent) in the second configuration can be used to provide a signal that is proportional to the quantity of illumination to which they are subjected, and appropriate (per-se known) circuitry may be used to determine thresholds for minimum and/or maximum light input intensity.

DESCRIPTION OF THE VARIOUS EMBODIMENTS

Figure 1:
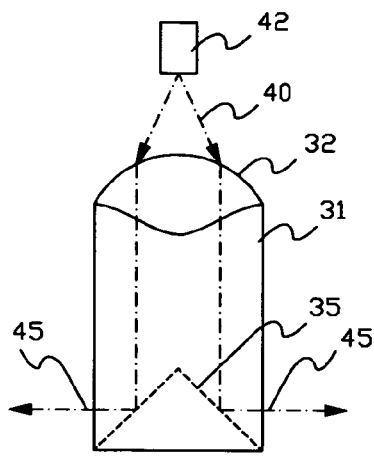
FIGS. 1, 2 and 3 are, respectively, side views of optical target axicons illustrating the use of the invention to transform an input beam into a shaped beam of predetermined size and configuration

An axicon constructed according to the invention as shown in FIGS. 1-8, as comprising a generally cylindrical body having an outer surface 31, a first end surface 32 and a second end surface 35. A light input beam 40 from a suitable source is directed into one of those surfaces and through the axicon to the other of those surfaces, and the beam is transformed by the axicon into a beam 45 of particular shape exiting such other surface. The shape and angular extent of the exit beam will depend, in part, on the selected position of the first surface with respect to the optical axis of the axicon and/or the second surface.

In one example of a configuration the shaped exit beam can be used (for example) as a reference defining a plane and can be detected, for example, by passing a photodiode through the exit beam 45. Multiples of these units can be used, for example, to define otherwise invisible boundaries or limits within a predetermined space (see FIGS. 9-12). In another configuration light rays 36 from the sides of the axicon can enter the axicon as an input and be shaped to a defined beam 32 directed as an output on a photodetector or the like.

Figure 2:
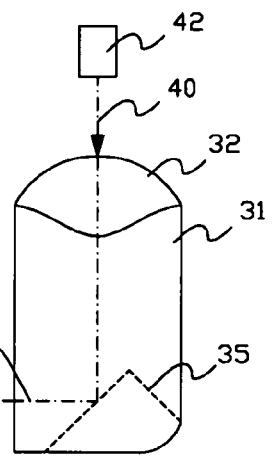
Figure 3:
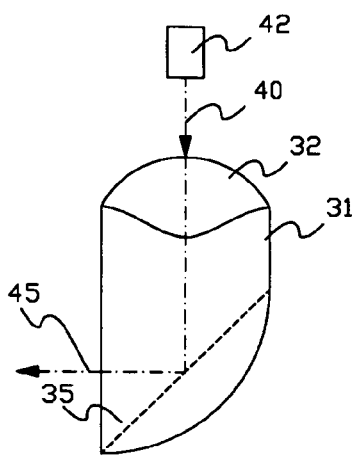

Referring to FIGS. 1, 2 and 3, a configuration of the invention comprises a axicon body with an outer surface 31, a first suface on the body which is a lens surface 32, and the second surface on the body, which is a conic surface 35. Here, an input beam 40, typically a laser beam generated by a laser diode, is directed into and along the axicon, entering at first surface 32 and along the axicon to the conic surface 35, and the beam is transformed by the axicon into beams 42 exiting outward from conic surface 35. The width and angular extent of the exit beam will depend on the selected position of the conic surface 35 with respect to the optical axis of first surface 32 and/or the optical axis of the axicon body itself, as illustrated respectively in FIGS. 1, 2 and 3.

Figure 4:
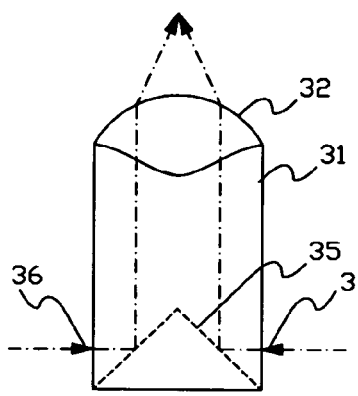
FIGS. 4, 5 and 6 are side views similar to FIGS. 1, 2 and 3, illustrating the use of the invention to transform surrounding light patterns, e.g. a fan shaped beam, into a focused beam.
Figure 5:
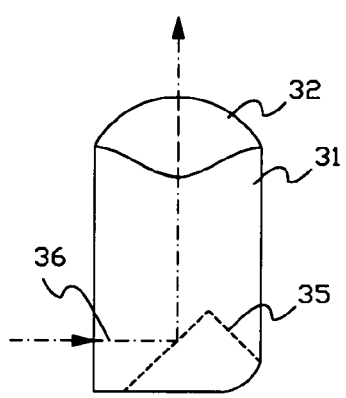
Figure 6:
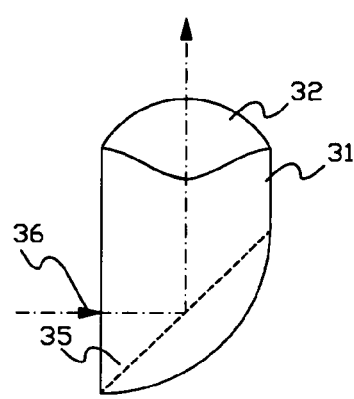

Referring to FIGS. 4, 5, and 6, other configurations and forms of axicons are shown as incorporating a cylindrical body (by way of example) which has an outer side surface 31 of predetermined shape (in this case a right cylinder), surface lens 32 adjacent one of its ends, and a biconic surface lens 35 at the other end. The conic (or partially conic) surface 35 is formed as a segment of a cone extending across or partially across the opposite end of the body, i.e. opposite lens 32.

Figure 7:
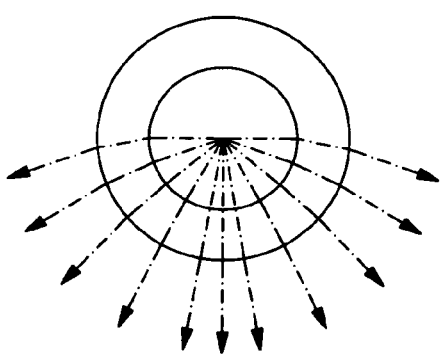
FIG. 7 is a top end view of the axicon shown in FIG.3, with ray direction lines superimposed thereon.

In FIG. 4 the conic surface 35 (which in this case is the input) is coaxial with lens surface 32 (which is the output)and with the axis of the axicon body. In FIG. 6, the conic surface 35 is offset with respect to the optical axis of output lens 32. In FIG. 7, the apex of the conic surface 35 is coincident with or outside the side surface of the axicon.

In each case, the curvature of surface 35 is chosen such that it redirects light from a beam impinged on the outer surface of the body opposite the conic segment surface 35. Thus the surfaces 32 and 35 together function as an axicon which redirects rays from a beam or beams incoming from entirely or partially around surface 31, opposite from and onto surface 35. The different locations of the conic surfaces, shown in FIGS. 5, 6, and 7, will dictate the extent of the angle of acceptance of an input beam 36 about the surface 31. This configuration can be used to direct the exiting concentrated light from lens 32 onto a photo sensor, and utilized in the same general manner as described above.

Figure 8:
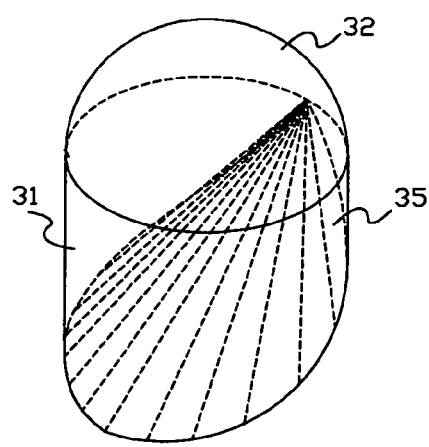
FIG. 8 is a perspective view of the other end of the axicon shown in FIG. 6, with ray direction lines superimposed.
Figure 9:
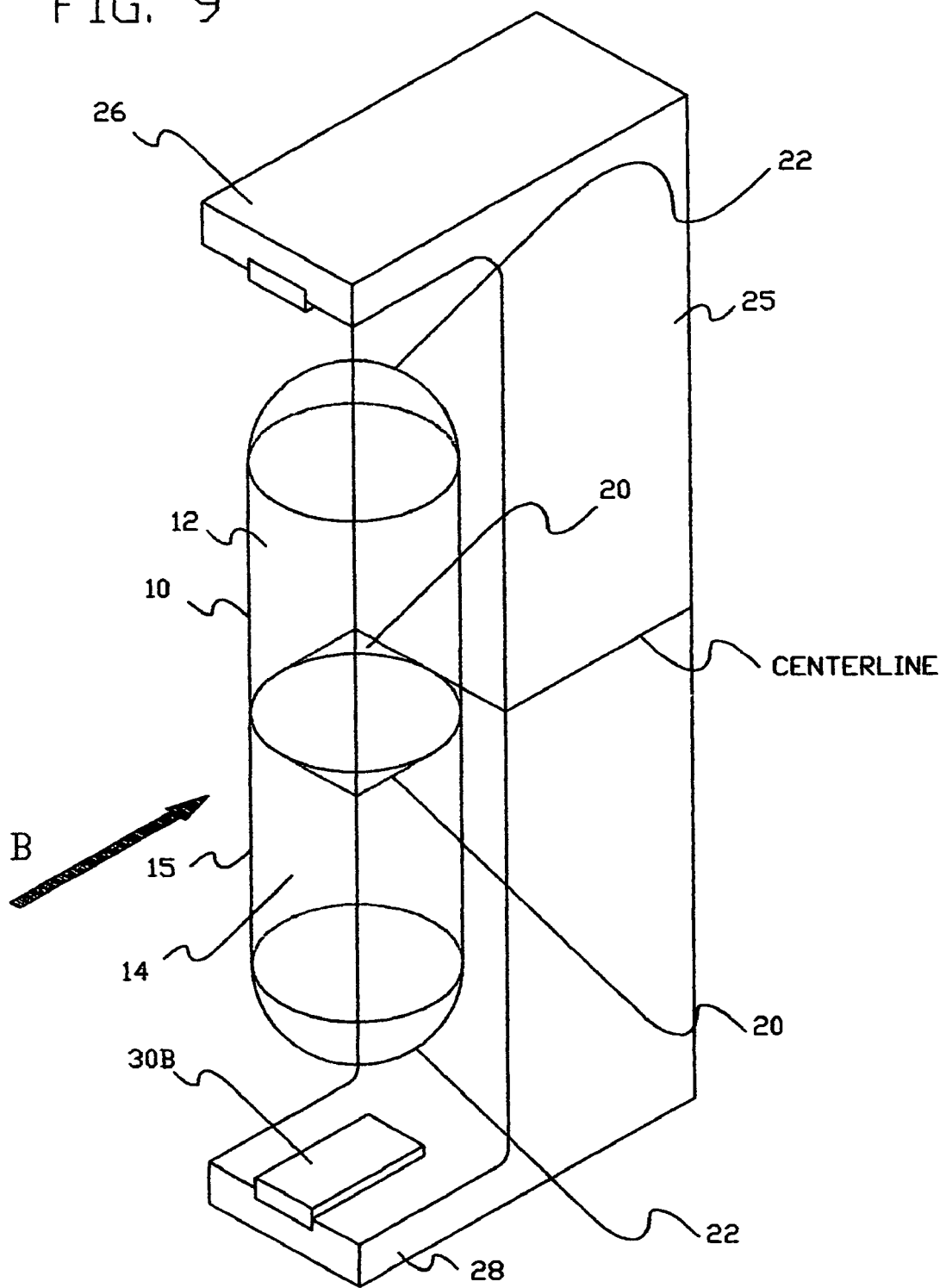
FIG. 9 is a perspective view of a dual optical target instrument according to the invention, supported in a generally U-shaped body, which redirects incoming light from a major portion of the sides of the optical target members onto a pair of spaced apart photo sensors.
Figure 10:
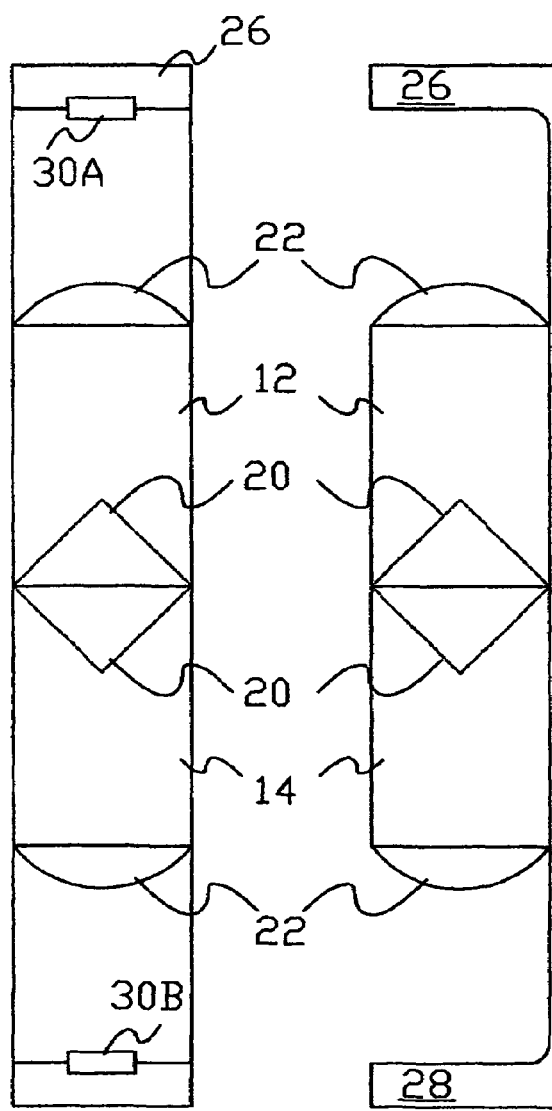
FIG. 10 is a front view of the instrument shown in FIG. 9.
Figure 11:
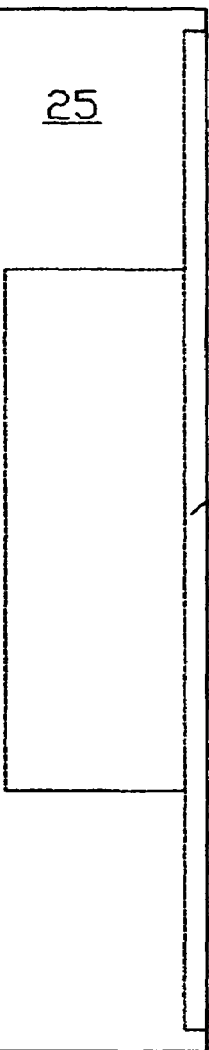
FIG. 11 is a side view of the instrument shown in FIG. 9.
Figure 12:
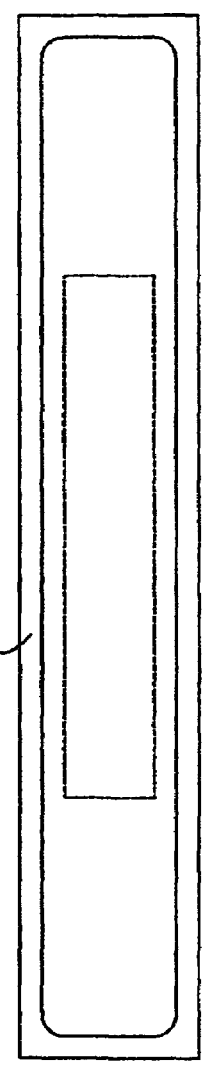
FIG. 12 is a rear view of the instrument shown in FIG. 9.

FIGS. 7 and 8 are top and isometric views, respectively, of the axicons as shown in FIGS. 3 and 6. These figures show ray lines in FIG. 7 to illustrate the acceptance angle of the axicon, and a wire frame illustration in FIG. 8 of the conic surfaces 35 in FIGS. 3 and 6.

All of the above described unique axicons can be constructed as integral units in their final configuration. They can be manufactured from a single bar or block of optical grade material, or molded as a single unit. Optionally, the axicons can be formed of input and output sections, preferably joined to each other, rather than mounted together. The axicons are passive devices that require a minimum of adjustment in performing the various beam transformations described above, and are capable of functioning with quite low levels of energy.

Referring to FIGS. 9 through 12, an optical target instrument is shown which is essentially omnidirectional in input sensitivity. For purposes of explanation, it will be assumed that a reference beam, preferably of coherent light (e.g. a laser beam) is directed along a path indicated by arrow B. Thus, in each part of the dual optical unit shown in FIGS. 9-12, the cylindrical outer surface 14 and the conical interior surface 20, plus the first outer surface (lens surface) 22, function as an axicon which redirects light rays received by the outer surface 15 into the lens 22 which concentrates and transforms them at the end of the body 10 opposite the conical surface.

The beam B can impinge on the dual optical unit 10 which is comprised of like units 12 and 14 attached in vertically opposed relation such that the cylindrical outer side surfaces 15 of the joined units function as the input surface of the optical unit, and the center of the dual optical unit is at their joint. In this embodiment, internally of the units there are conical surfaces 20 which have their axes coincident with the axis of the outer surfaces 15 and which function to redirect light rays It should be understood that a single one of the dual unit axicons 10 has utility of its own, but the joined pair are illustrated by way of explanation of an up-down control instrument. This instrument comprises a generally U-shaped body 25 with forward projecting arms 26 and 28 which support photo sensors 30A and 30B. The main portion of the body is hollow and is a convenient housing for a portable power source and circuitry which is connected to the photo sensors or other associated electronic equipment.

The dual optical unit is supported between the arms 26, 28. In the illustrated orientation this unit is vertically supported. Lenses 22 serve to concentrate the light reflected from conical surfaces 20 onto upper and lower photo sensors 30A, 30B. When the input beam is centered on the joint of the two optical units, at the bases of the respective conical surfaces, the quantity of light directed to the two photo sensors is equal, i.e. the beam is equally divided. If the beam center is above or below the center, a greater quantity of light will be directed to the upper or lower photo sensor, as the case may be. Thus, the signal output of the photo sensors will be differential with respect the amount of displacement of the center of the dual optical unit from the beam centerline.

With the instrument body 25 oriented horizontally, the instrument can be used to detect lateral displacement with respect to the beam centerline. The respective optical units are capable of omni-directional sensitivity to beams directed against any part of their side surface, and appropriate changes in the mounting of a single or dual optical unit can be provided to achieve a desired result.

While the described articles, methods, and apparatus constitute preferred embodiments of this invention, the invention is not limited to these precise methods, articles, and forms of apparatus, and that changes may be made in either without departing from the scope of the invention defined in the appended claims.

What is claimed is:

1. An optical system comprising a light transmitting optical axicon body configured to redirect incoming light from a reference plane surrounding said axicon body to form a concentrated beam exiting the axicon body and also configured to redirect incoming light from a concentrated beam entering the axicon body to exit the axicon body to a reference plane as a reference exit beam having a predetermined angular extent and further comprising Said axicon body having an outer surface of predetermined width and length extending between first and second ends of said axicon body, a convex lens surface on said first end, and an inwardly extending second lens surface shaped as a section of a wall of a conic section within said second end of said axicon body Said lens surfaces and said body being aligned along a common plane, whereby light directed into said convex lens surface and reflected off said inwardly extending lens surface through and beyond said outer surface of said axicon body is transformed into a reference exit beam having a predetermined angular extent, and light entering said body along a plane surrounding said axicon body will reflect from said inwardly extending lens surface into said axicon body and will be transformed into a concentrated beam exiting through said convex lens surface.

2. An optical system as defined in claim 1, wherein said light transmitting optical body is a unitary member.

3. An optical system as defined in claim 1, wherein said light transmitting optical body is divided into two parts which are supported spaced apart and on a common optical axis extending through said curved lens surface and said inwardly extending lens surface.

4. An optical system as defined in claim 1, wherein said outer surface is a right cylinder and the center of said outwardly extending lens surface is coaxial with said optical body.

5. An optical system as defined in claim 1, wherein the reference exit beam is a fan-shaped beam exiting the second surface and defines at least a portion of a plane.

6. An optical system as defined in claim 1, wherein said outer surface is a right cylinder and the center of said inwardly extending lens surface is offset from the axis of said optical body.

7. An optical system as defined in claim 1, comprising a pair of cooperating optical members for re-directing light from a plane to a beam and from a beam to a plane, said members each comprising a cylindrical outer surface 15, a conical interior surface 20, and a curved outer lens surface 22, all supported on a common optical axis;

said conical and outer lens surfaces being supported to face each other, a pair of photodetectors, one each of which is supported opposite said outer lens surfaces: said system being constructed and arranged such that a) light rays can be received by the cylindrical outer surface 15 and directed into said conical interior surfaces are divided and redirected along the optical axis toward lens surface 22, and each lens surface concentrate and transform the light rays into a beam directed to the associated photodetector; and that b) an input beam can be directed into said lens surface 22 and along the axis of the system to the conical surfaces 20, whereby the light rays of the resultant beam will be redirected and transformed by the conical interior surface into a planar beam exiting the cylindrical outer surface.

\* \* \* \* \*